United States Patent [19]
White

[11] Patent Number: 4,541,178
[45] Date of Patent: Sep. 17, 1985

[54] ALIGNMENT TRANSFER AND VERIFICATION SCHEME FOR A PORTABLE LAND NAVIGATION SYSTEM

[75] Inventor: Harold V. White, Huntsville, Ala.

[73] Assignee: The United States of America as represented by the Secretary of the Army, Washington, D.C.

[21] Appl. No.: 538,633

[22] Filed: Oct. 3, 1983

[51] Int. Cl.⁴ .............................................. B23B 35/00
[52] U.S. Cl. .................................... 33/180 R; 33/299
[58] Field of Search ............. 33/180 R, 181 R, 174 H, 33/299; 248/673, 676, 678, 177, 180

[56] References Cited
U.S. PATENT DOCUMENTS 2,082,324  6/1937  Crafts et al. ............... 248/678 X
4,290,574  9/1981  Archibald .................. 33/299 X
4,360,974  11/1982  Cuissart .................. 33/174 H X

OTHER PUBLICATIONS

Procedures in Experimental Physics by J. Strong, Prentice-Hall, pp. 585–590.

Primary Examiner—Harry N. Haroian
Attorney, Agent, or Firm—Anthony T. Lane; Robert P. Gibson; Harold W. Hilton

[57] ABSTRACT

Method and apparatus for transferring alignment (attitude) from a land navigation system (LNS) mounted on a carrier vehicle to another structure such as a missile launcher or a radar station. The invention also embodies a scheme for verifying the accuracy of the transfer concept. The essential feature is a mechanical interface between the protable element of the LNS and the housing of the receiving structure. The interface is accomplished through two rods attached to the LNS portable element and two mating V-groove parts attached to the receiving element housing. The scheme is simple, rugged and inexpensive and is different from other methods in that alignment is transferred mechanically via the rod/V-groove mechanization.

3 Claims, 4 Drawing Figures

ALIGNMENT TRANSFER AND VERIFICATION SCHEME FOR A PORTABLE LAND NAVIGATION SYSTEM

DEDICATORY CLAUSE

The invention described herein may be manufactured, used, and licensed by or for the Government for governmental purposes without the payment to me of any royalties thereon.

BACKGROUND OF THE INVENTION

Some missile systems utilize launchers having a plurality of missiles thereon. The launchers may be deployed in the field and spaced around a single radar system. The launchers may be miles away from each other and from the radar system and at different altitudes.

In the present invention, a carrier vehicle is provided with a land navigation system (LNS) thereon. Method and apparatus of the present invention is disposed for transferring alignment (attitude) from the land navigation system to another structure such as the missile launchers and radar system referred to above.

The essential feature is a mechanical interface between the portable land navigation system and a housing on the missile launchers which receives the portable LNS. The interface is accomplished through a pair of rods attached to the portable LNS element and a pair of mating V-groove members attached to the receiving element housing.

The invention also includes mechanism for verifying the accuracy of the transfer.

SUMMARY OF THE INVENTION

Method and apparatus for transferring alignment (attitude) from a land navigation system (LNS) mounted on a carrier vehicle to another structure such as a missile launcher or radar station. A pair of rods are provided on the portable element of the LNS and a pair of V-grooves are provided on the receiving structure and on its housing on the carrier vehicle so that when the portable element is removed from its housing on the carrier vehicle, it will be in accurate alignment in the housing of the launcher.

DESCRIPTION OF THE PREFERRED EMBODIMENT

Figure 1:
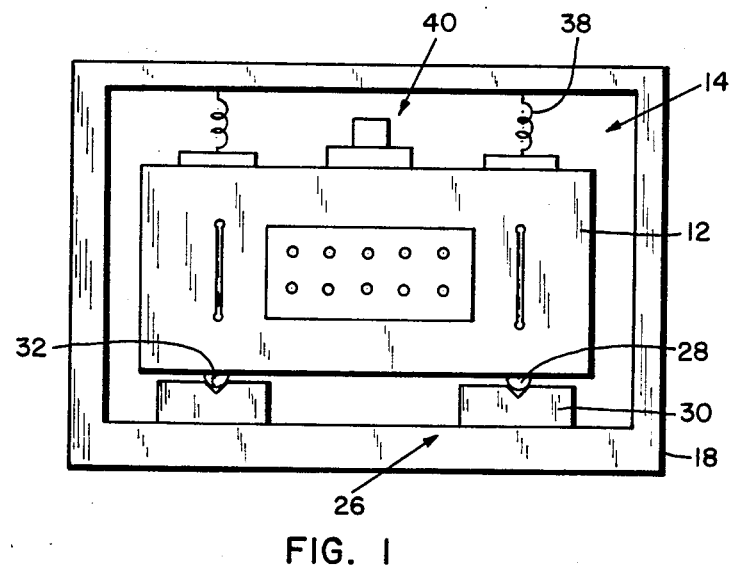
FIG. 1 is a front elevational view of the portable land navigation system installed in its housing.
Figure 2:
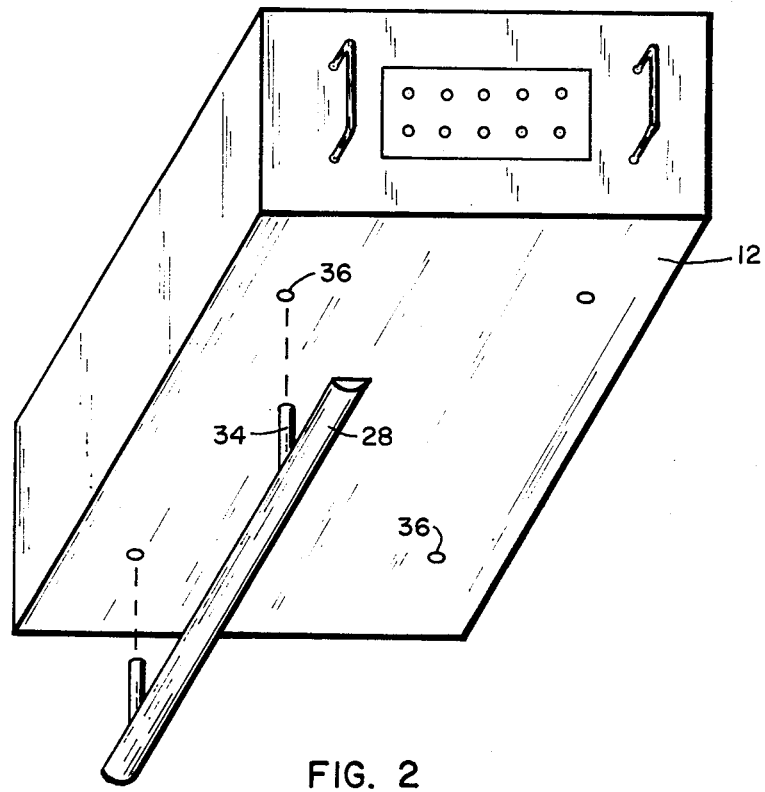
FIG. 2 is a pictorial view of the portable land navigation system.

As seen in FIG. 1 the portable element 12 of a land navigation system 14 is accurately referenced to a housing 16 which is attached to a carrier vehicle 18. The land navigation system typically includes an inertial measurement unit including three gyros and three accelerometers with electronics (including a computer) to define and maintain a reference coordinate system and to measure changes in latitude, longitude and altitude as the carrier vehicle traverses from a known reference point to other positions.

Figure 3:
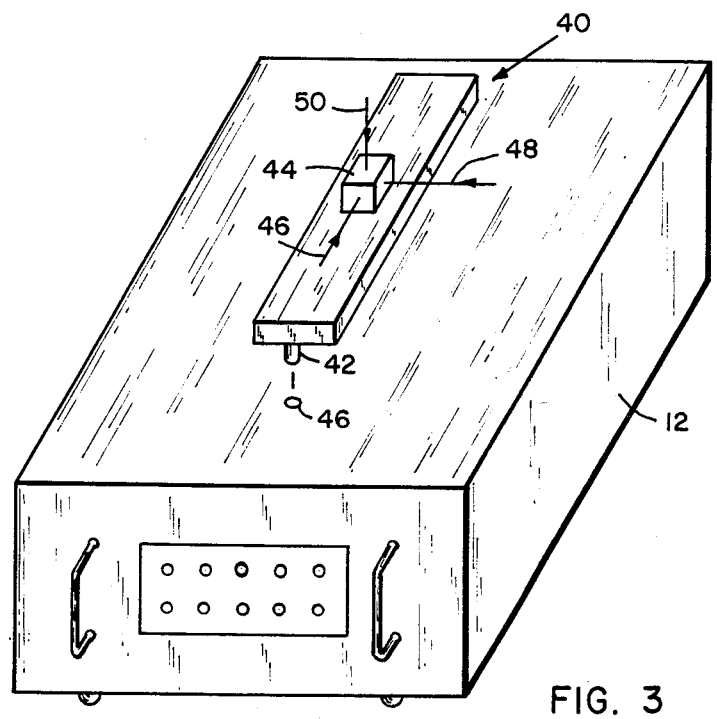
FIG. 3 is a pictorial view of the device of FIG. 1 illustrating the accuracy verification device.
Figure 4:
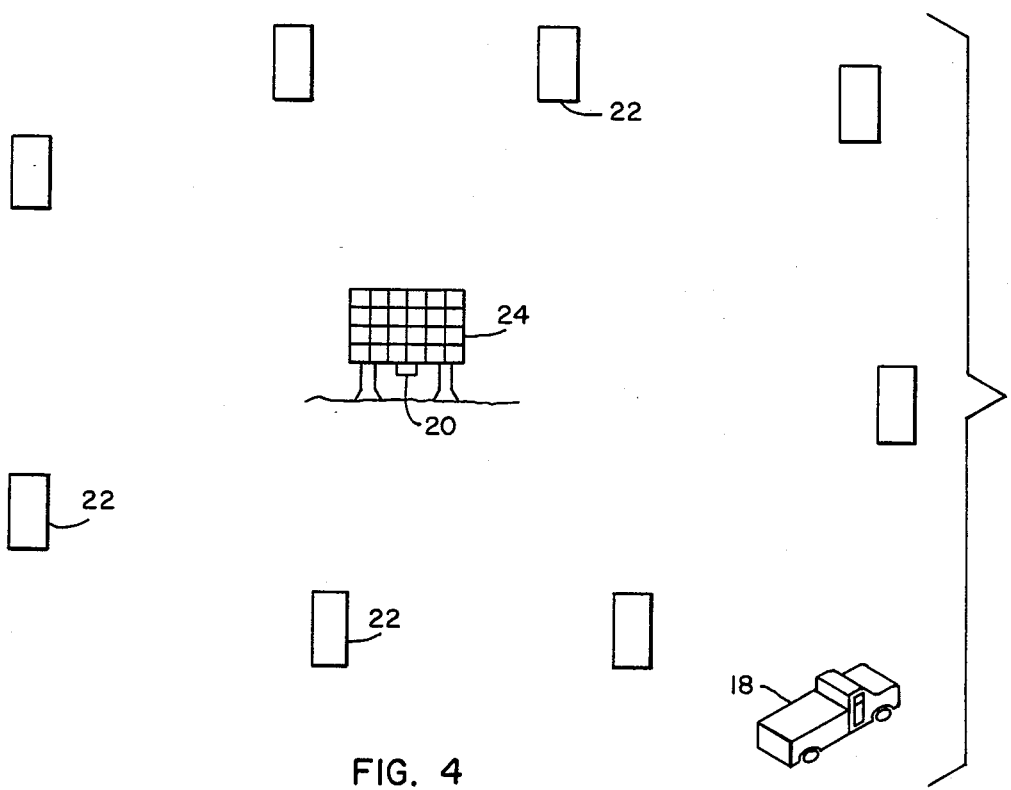
FIG. 4 is a diagrammatic illustration of a missile system deployed in the field and illustrating a carrier vehicle for transporting the land navigation system.

A housing 20, similar to housing 16, is attached to each launcher 22 and to the radar station 24 positioned in the field (FIG. 3). In operation, vehicle 18 is positioned over a bench mark whose coordinates are known and the known coordinates are recorded in the LNS through a console 21 on the LNS. Vehicle 18 then transports the LNS over the terrain to each launcher 22 and to the radar set 24. The portable element 12, which has recorded any deviations from the bench mark coordinates, is inserted in housing 20 and information relating to position and attitude at that particular location is transferred from the LNS into the appropriate launcher or radar station. Console 21 transmits position and attitude data to a remote location, such as a launch control station, over a connecting cable. This provides the launch control station with necessary initial conditions, i.e., location of radar and launchers and pointing of radar line-of-sight and launchers, for engaging incoming targets.

Accuracy of alignment transfer is maintained through the use of two V-groove elements 26 and two rods 28. Each element 26 includes a member 30 secured to housings 16 and 20 and each member 30 is provided with a V-groove 32 therein. Rods 28 are secured to the portable LNS element 12. The V-groove and rods are machined to tolerances specified by the required alignment transfer accuracy. Precision rod dowels 34 secured to rods 28 and precision rod dowel pin holes 36, in portable element 12 are accurately placed to maintain parallelism between rods 28. Parallelism of the V-groove elements 26 is insured by loosely attaching them to housing 16, installing LNS portable element 12 with accurately placed rods 28 and securing V-groove elements 26 to housing 16. Spring assemblies 38 maintain positive engagement of V-groove elements 26 and rods 28 any time the portable element is installed in the housing.

Apparatus for verifying the accuracy of the transfer includes an alignment member 40 which incorporates precision dowel pins 42 and a precision optical cube 44. The member 40 is installed in accurately placed tool dowel pin holes 46 which are aligned and drilled at the same time rod dowel pin holes 26 are aligned and drilled to maintain precise reference to rods 28. The optical cube 44 is accurately oriented relative to dowel pins 9. Orientation of the cube 44 and therefore the member 40 is determined by sighting along pitch axis 46 and roll axis 48 with theodolites. Orientation about azimuth axis 58 is determined by theodlite sightings made along either axis 46 or 48. Orientation about pitch axis 46 is determined by theodolite sightings along roll axis 48. Orientation about roll axis 46 is determined by theodolite sightings along pitch axis 46. Orientation and parallelism of rod dowel pin holes 36 relative to tool dowel pin holes 52 can be determined by removing rods 28 and installing member 40 and making optical measurements as described above. The alignment device as mounted in FIG. 3, is also used to verify accuracy of attitude readout of the LNS portable element 12. LNS portable element 12 provides angular orientation data about axes nominally aligned with optical cube axes 46, 48 and 50. Accuracy of the portable element 12 attitude readouts are assessed by comparing these with theodolite measurements made along axes 46, 48 and 50.

I claim:

1. Apparatus for transferring attitude alignment from a portable land navigation system to a stationary structure comprising:
   a. a carrier vehicle having a first housing thereon, said land navigation system including a portable element carried in said housing in accurately aligned relation;
   b. means carried by said first housing and said land navigation system for assuring said accurately aligned relation, said means including a pair of rods attached to said portable land navigation system in parallel spaced relation, and, a pair of members secured to said first housing in parallel, spaced relation to receive said rods therein;
   c. a second housing carried by said stationary structure to receive said portable element subsequent to said first housing; said second housing being similar to said first housing; and,
   d. verification means carried on said portable element of said land navigation system for verification of alignment of said portable element in said housings.

2. Apparatus as in claim 1 wherein said verification means includes an alignment member accurately mounted on said portable member and a precision optical cube mounted on said member, whereby orientation of said optical cube and therefore said alignment member is determined by sighting along the three mutually perpendicular axis of said alignment member.

3. A method for transferring alignment from a land navigation system including a portable member having means for alignment thereof on a first housing on a carrier vehicle, to a stationary structure comprising the steps of inserting a set of known coordinates into said portable member at a presurveyed position in the field, transporting said portable member to said stationary structure, said portable member of said land navigation system being disposed for recording deviations from said known coordinates during movement thereof, removing said portable member subsequent to arrival of said carrier vehicle to said stationary structure, inserting said portable element into a second housing on said stationary structure, said second housing being similar to said first housing on said carrier vehicle, transferring a second set of coordinates from said land navigation system to said second structure, said second set of coordinates being indicative of the deviations from said first set of coordinates; and, determining the attitude of the stationary structure.

* * * * *